US011055702B2

(12) United States Patent
Kim

(10) Patent No.: US 11,055,702 B2
(45) Date of Patent: Jul. 6, 2021

(54) METHOD OF AUTOMATICALLY PROVIDING CRYPTOCURRENCY CASHBACK USING BLOCKCHAIN TECHNOLOGY

(71) Applicant: Universal Group Co., Ltd., Gwangju (KR)

(72) Inventor: In Gi Kim, Gwangju (KR)

( * ) Notice: Subject to any disclaimer, the term of this patent is extended or adjusted under 35 U.S.C. 154(b) by 103 days.

(21) Appl. No.: 16/447,952

(22) Filed: Jun. 20, 2019

(65) Prior Publication Data

US 2020/0342451 A1    Oct. 29, 2020

(30) Foreign Application Priority Data

Mar. 27, 2019    (KR) ........................ 10-2019-0035218

(51) Int. Cl.
| | |
|---|---|
| *G06Q 20/36* | (2012.01) |
| *G06Q 20/06* | (2012.01) |
| *G06Q 20/38* | (2012.01) |
| *G06Q 30/02* | (2012.01) |

(52) U.S. Cl.
CPC ..... *G06Q 20/3678* (2013.01); *G06Q 20/0658* (2013.01); *G06Q 20/389* (2013.01); *G06Q 30/0215* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 2018/0144360 | A1* | 5/2018 | Kang | G06Q 30/0226 |
| 2019/0228409 | A1* | 7/2019 | Madisetti | H04L 9/0637 |
| 2020/0258099 | A1* | 8/2020 | Alghamdi | G06F 16/1834 |
| 2020/0279249 | A1* | 9/2020 | Ta | G06F 9/54 |

FOREIGN PATENT DOCUMENTS

| | | |
|---|---|---|
| JP | 2001-160109 A | 6/2001 |
| JP | 2013-531855 A | 8/2013 |
| JP | 2017-054339 A | 3/2017 |
| KR | 10-2016-0009716 | 2/2016 |
| KR | 10-1813256 | 12/2017 |
| KR | 10-2018-0119488 | 11/2018 |

OTHER PUBLICATIONS

English Specification of 10-2016-0009716.
English Specification of 10-2018-0119488.
English Specification of 10-1813256.
English Specification of JP2001-160109A.
English Specification of JP2013-531855A.
English Specification of JP2017-054339A.

* cited by examiner

*Primary Examiner* — Firmin Backer
(74) *Attorney, Agent, or Firm* — Antonio Ha & U.S. Patent, LLC

(57) ABSTRACT

In a method of providing cryptocurrency cashback using blockchain technology, in which when cryptocurrency is transferred from the payer's electronic wallet to the affiliated store's electronic wallet according to payment via cryptocurrency using blockchain technology, the payment server 200 provides cryptocurrency cashback, an embodiment of the disclosure provides credits proportional to the amount of payment, as cashback, to the payer's credit electronic wallet, and the affiliated store receiving the amount of payment deducts points proportional to received points from the received points and stores in the affiliated store's credit electronic wallet.

8 Claims, 6 Drawing Sheets

METHOD OF AUTOMATICALLY PROVIDING CRYPTOCURRENCY CASHBACK USING BLOCKCHAIN TECHNOLOGY

CROSS-REFERENCE TO RELATED APPLICATION(S)

This application is based on and claims priority under 35 U.S.C. 119 to Korean Patent Application No. 10-2019-0035218, filed on Mar. 27, 2019, in the Korean Intellectual Property Office, the disclosure of which is herein incorporated by reference in its entirety.

TECHNICAL FIELD

Embodiments of the disclosure relate to a method of automatically providing cryptocurrency cashback using blockchain technology.

DESCRIPTION OF RELATED ART

A cryptocurrency (or crypto currency) is a digital asset designed to work as a medium of exchange that uses strong cryptography to secure financial transactions, control the creation of additional units, and verify the transfer of assets. Cryptocurrencies use decentralized control as opposed to centralized digital currency and central banking systems. The decentralized control of each cryptocurrency works through distributed ledger technology, typically a blockchain, that serves as a public financial transaction database. Bitcoin, first released as open-source software in 2009, is generally considered the first decentralized cryptocurrency. Since the release of bitcoin, over 4,000 altcoins (alternative variants of bitcoin, or other cryptocurrencies) have been created. Cryptocurrency exchanges allow customers to trade cryptocurrencies for other assets, such as conventional fiat money, or to trade between different digital currencies.

Cryptocurrency transactions may be made in various manners, via, e.g., the Internet or other networks, and QR code, and may also occur over ATMs.

A current limitation exists in cryptocurrency transactions in light that there are only few online/offline stores where cryptocurrencies can be used to purchase goods. There is no means to give cashback for payment via cryptocurrency and this poses an obstacle to flourishing payment via cryptocurrency.

SUMMARY

According to an embodiment, there is provided means capable of automatically providing cashback upon payment via cryptocurrency.

According to an embodiment, there is provided a method of providing cryptocurrency cashback using a blockchain technology. In the method, when cryptocurrency is transferred from a payer's electronic wallet to an affiliated store's electronic wallet according to payment with cryptocurrency using the blockchain technology, a payment server provides cryptocurrency cashback. Credits proportional to the amount of payment are cashbacked to the payer's credit electronic wallet, and the affiliated store receiving the amount of payment deducts points proportional to received points from the received points and stores in the affiliated store's credit electronic wallet.

According to an embodiment, the method may include a point loading step in which the amount of money proportional to cryptocurrency loaded by the payer is converted into points and the converted points are loaded to the payer's point electronic wallet, a point transfer step in which when payment is made in the affiliated store of the payment server, points corresponding to the amount of money to be sent for the payment are transferred to the affiliated store, a payment credit accrue step in which credits proportional to the points corresponding to the amount of payment are cashbacked, as payment credits, to the payer's credit electronic wallet, an affiliated store credit accrue step in which credits proportional to the points received by the affiliated store receiving the amount of payment are cashbacked, as reception credits, to the affiliated store's credit electronic wallet, and an affiliated store point accrue step in which points corresponding to the reception credits are deducted from the points received by the affiliated store receiving the amount of payment and accrued in the affiliated store's point electronic wallet.

According to an embodiment, the payment credit accrue step may include cashbacking credits, which result from applying a payment cashback ratio to the points corresponding to the amount of payment, as payment credits, to the payer's credit electronic wallet.

According to an embodiment, the payment cashback ratio may be varied depending on how often the payer uses the affiliated store.

According to an embodiment, the payment cashback ratio may be varied depending on the kind of a good paid for in the affiliated store.

According to an embodiment, the affiliated store credit accrue step may include cashbacking credits, which result from applying an affiliated store cashback ratio to the points received by the affiliated store receiving the amount of payment, as reception credits, to the affiliated store's credit electronic wallet.

According to an embodiment, the affiliated store cashback ratio may be varied depending on the kind of a good carried in the affiliated store.

According to an embodiment, the payment cashback ratio and the affiliated store cashback ratio may be automatically varied in association with each other.

According to an embodiment, the affiliated store cashback ratio may be determined considering profit and loss due to a cryptocurrency market fluctuation at a time of the payment and at a time of the transfer.

According to various embodiments of the disclosure, payment via cryptocurrency in affiliated stores may be increased, thus allowing the affiliated store more revenue. According to various embodiments, a type of cryptocurrency may be exchanged to other type of cryptocurrency anytime in any International cryptocurrency exchange. Thus, more user satisfaction may be achieved.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Advantages and features of the present disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. When determined to make the subject matter of the disclosure unclear, the detailed description of the known art or functions may be omitted.

Figure 1:
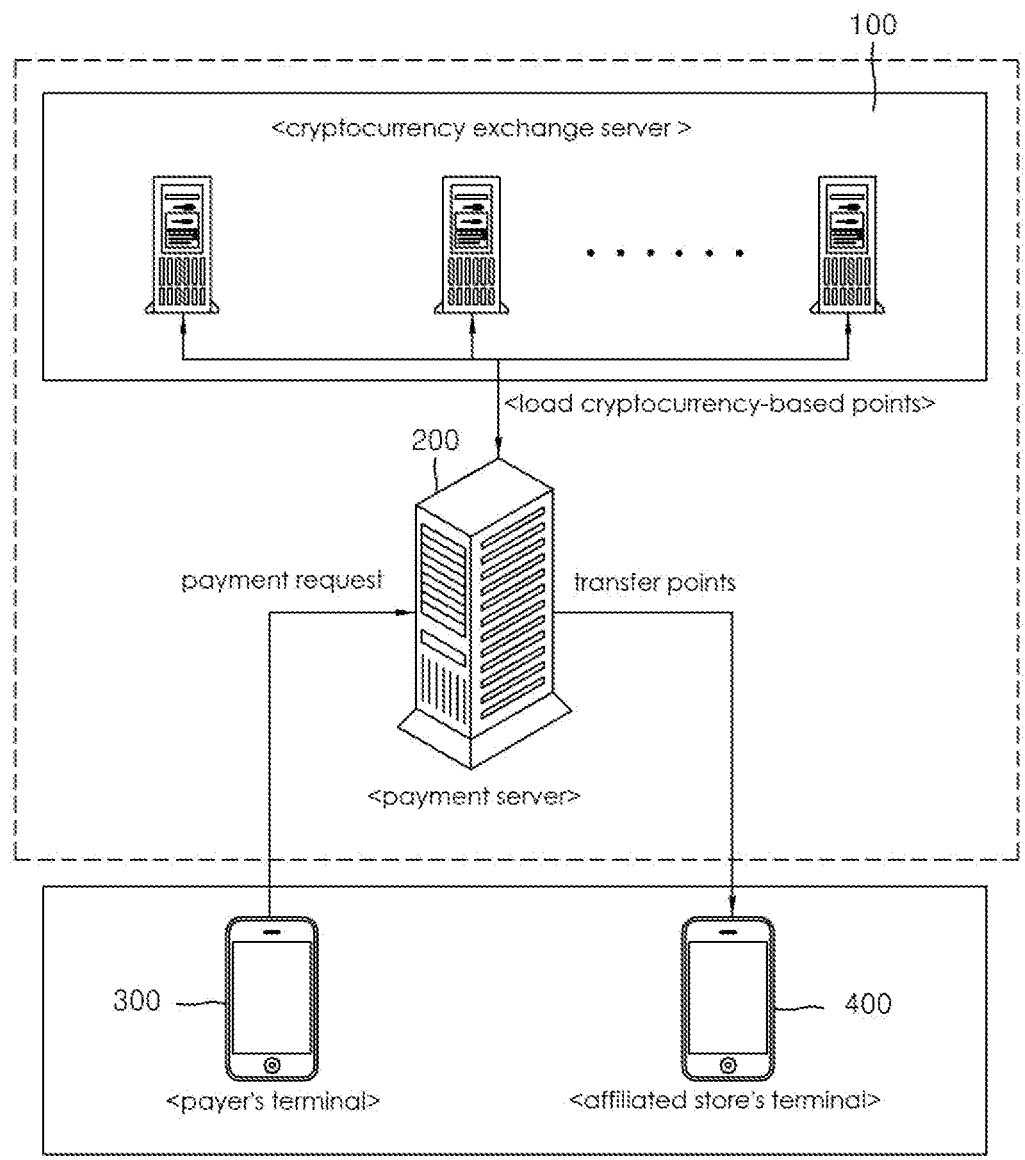
FIG. 1 is a view illustrating a configuration of an automated cryptocurrency cashback providing system using blockchain technology, according to an embodiment.
Figure 2:
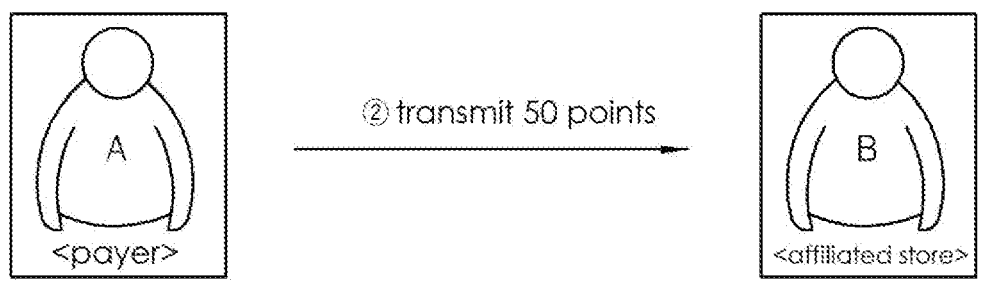
FIG. 2 is a view illustrating a flow of automatically providing cryptocurrency cashback using blockchain technology according to an embodiment.

FIG. 1 is a view illustrating a configuration of an automated cryptocurrency cashback providing system using blockchain technology, according to an embodiment. FIG. 2 is a view illustrating a flow of automatically providing cryptocurrency cashback using blockchain technology according to an embodiment.

As used herein, the term "cryptocurrency" may collectively refer to bitcoin, bitcoin cash, Ethereum, Litecoin, Namecoin, Dogecoin, Ripple, or any other various digital cryptocurrencies traded in exchanges.

Referring to FIG. 1, a system according to an embodiment includes a wired/wireless communication network (not shown), a cryptocurrency exchange server 100, a payer terminal 300, an affiliated store terminal 400, and a payment server 200.

The wired/wireless communication network (not shown) is a communication network to support wired or wireless communication between the cryptocurrency exchange server 100, the payer terminal 300, the affiliated store terminal 400, and the payment server 200. Where the wired/wireless communication network is implemented as a wireless communication network, data communication may be performed via a wireless mobile communication network including a base station (or base transceiver station (BTS)), a mobile switching center (MSC), and a home location register (HLR). The mobile radio communication network may include, in the base station (BTS), mobile switching center (MSC), and home location register (HLR), an access gateway, a packet data serving node (PDSN), or other components to enable transmission and reception of wireless packet data. Where the wired/wireless communication network is implemented as a wired communication network, data communication may be performed as per Internet protocols, such as transmission control protocol/Internet protocol (TCP/IP).

The cryptocurrency exchange server 100 may generate an electronic wallet for performing blockchain trading and provide the electronic wallet to each member.

Where member A loads his cryptocurrency on the payment server 200, the cryptocurrency of A's cryptocurrency electronic wallet in the cryptocurrency exchange server 100 is transferred to an electronic wallet of the payment server 200, and the payment server 200 converts the transferred cryptocurrency into a point and accrues the point in A's point electronic wallet. The cryptocurrency electronic wallet refers to a cryptocurrency account operated on the cryptocurrency exchange server 100, and the point electronic wallet refers to a point account operated on the payment server 200.

The payer terminal 300 is a payer's terminal and, although shown to be a smartphone in the drawings, may be one of other various communication terminals including tablet PCs or laptop computers. The payer terminal 300 chooses and purchases a good in an online or offline affiliated store of the payment server 200 and performs payment with points operated on the payment server 200.

The affiliated store terminal 400 is a terminal used in the affiliated store which has membership in the payment server and receives points used for payment.

When the payer's cryptocurrency is transferred from the payer's electronic wallet to the affiliated store's electronic wallet according to payment via cryptocurrency using blockchain technology, the payment server 200 provides cryptocurrency cashback.

To that end, the payment server 200 provides the credit proportional to the amount of payment, as cashback, to the payer's credit electronic wallet, and the affiliated store receiving the amount of payment deducts points proportional to received points from the received points and stores the points in the affiliated store's credit electronic wallet.

For example, where member A loads 100 points ('point' refers to the unit of payment of the payment company) using his 100 bitcoins as shown in FIG. 2, 12 points of the 100 points may be converted into 12 credits ('credit' refers to the unit of cashback of the payment company) and stored, and the remaining 88 points are accrued.

Where member A purchases a good of 50 points in affiliated store B, 50 of the 88 points in member A's point electronic wallet are transferred to affiliated store B while the other 38 points remain. 88% of the 50 points transferred are cashbacked as credits.

On the position of affiliated store B, 44 points, which are 88% of the 50 points transferred, are accrued as affiliated store B's points, and the remaining 12%, i.e., 6 points, are accrued as 6 credits of affiliated store B.

As used herein, 'credit' is the unit of cashback. Up to 1% of credits accrued everyday may be converted into points.

Figure 3:
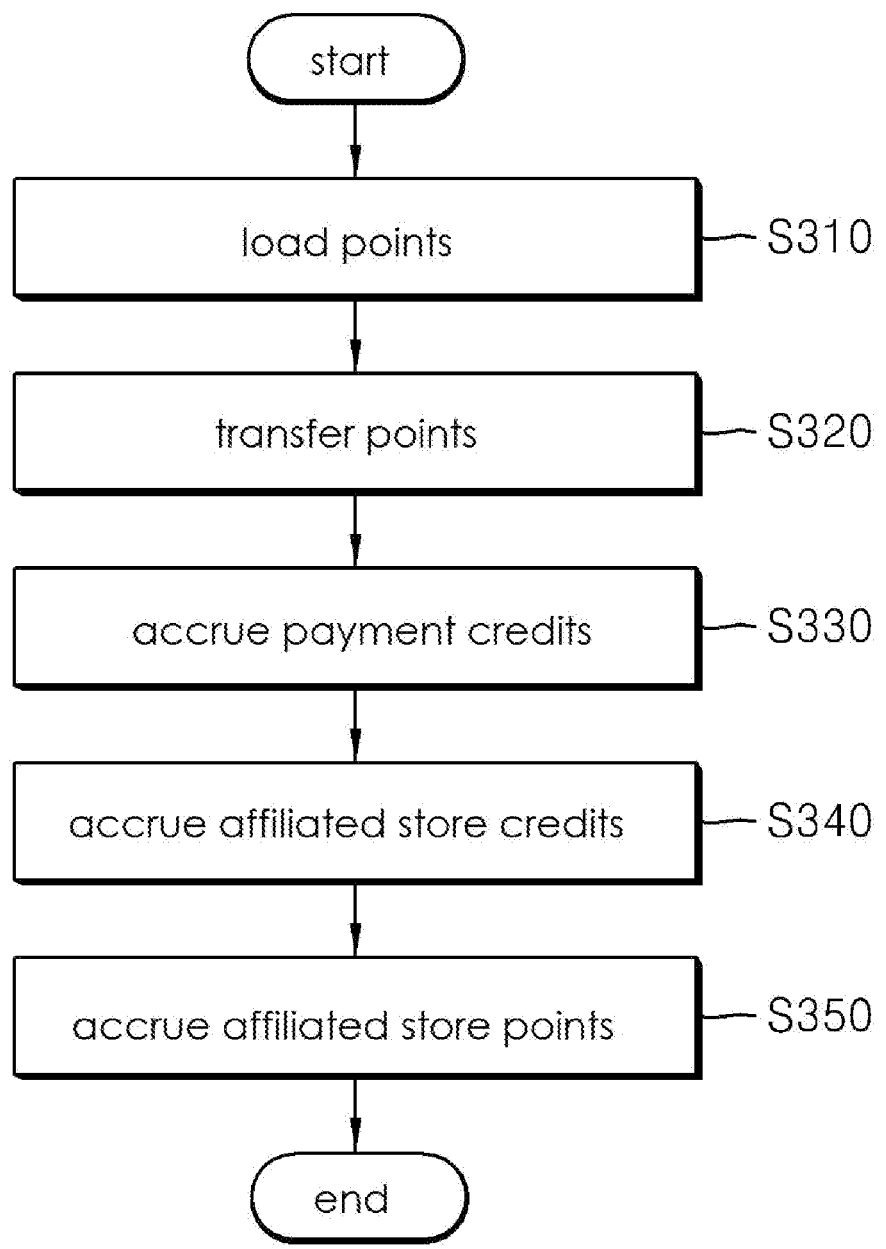
FIG. 3 is a flowchart illustrating a method of automatically providing cryptocurrency cashback using blockchain technology according to an embodiment.
Figure 4:
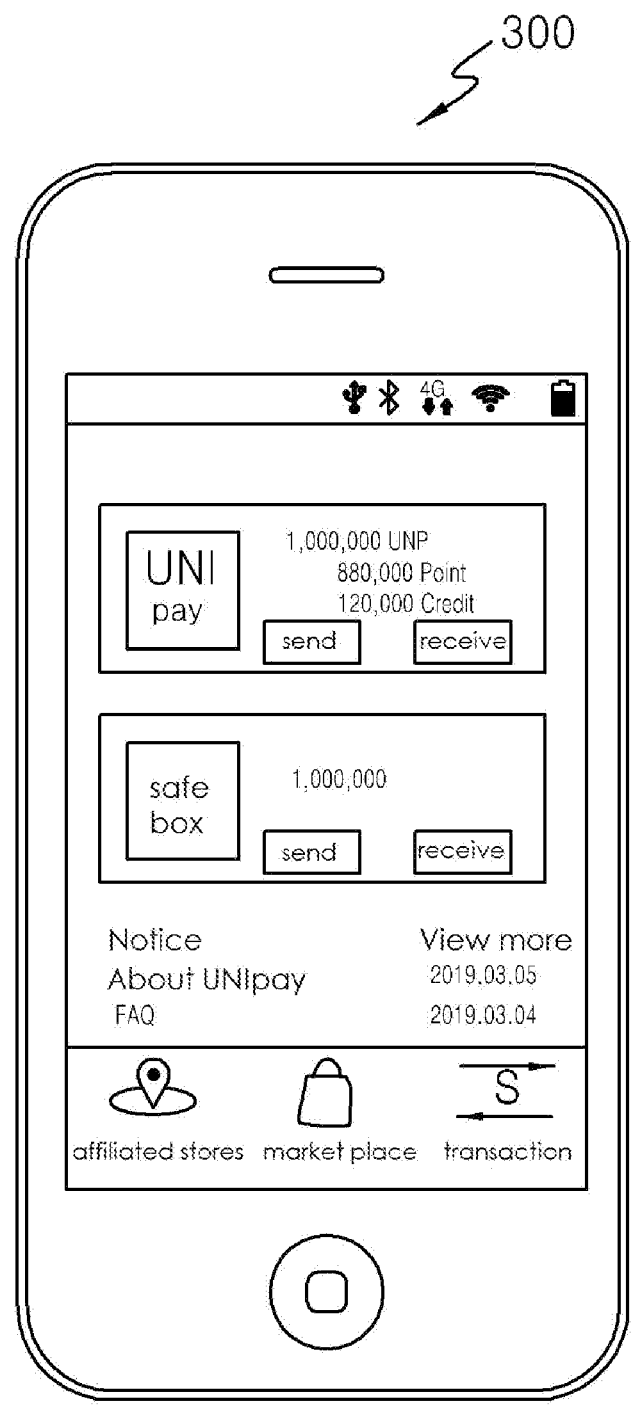
FIG. 4 is a view illustrating a main screen according to an embodiment.
Figure 5:
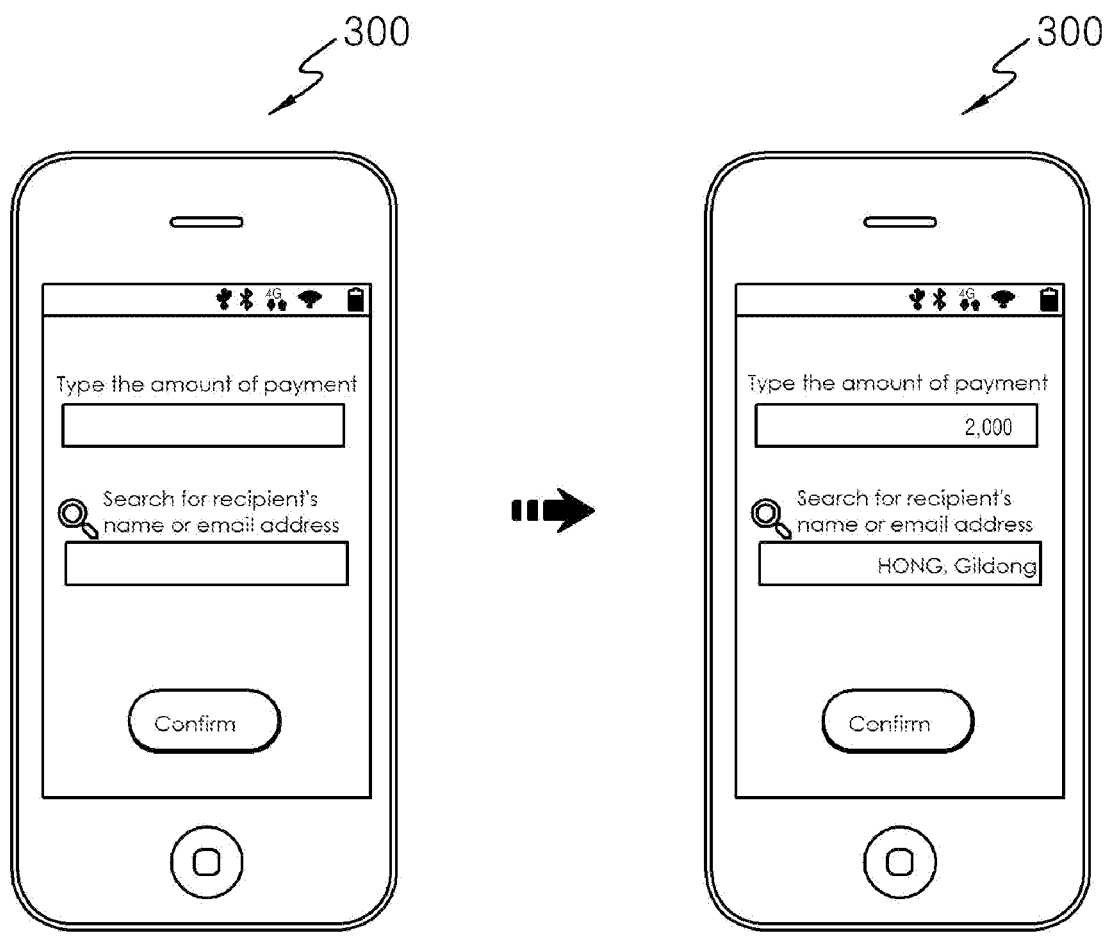
FIGS. 5 and 6 are views illustrating example screens of transmitting a point according to an embodiment.
Figure 6:
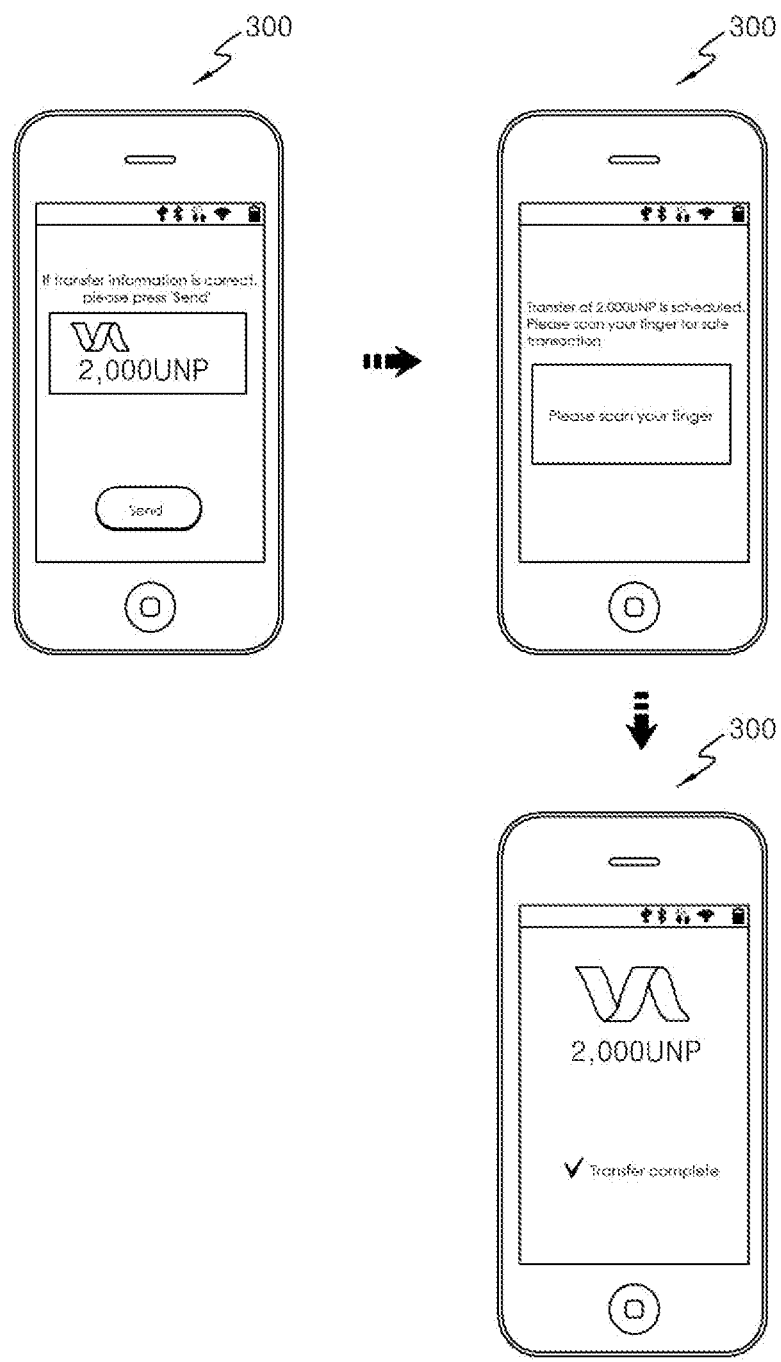

FIG. 3 is a flowchart illustrating a method of automatically providing cryptocurrency cashback using blockchain technology according to an embodiment. FIG. 4 is a view illustrating a main screen according to an embodiment. FIGS. 5 and 6 are views illustrating example screens of transmitting a point according to an embodiment.

In a method of providing cryptocurrency cashback using blockchain technology, in which when cryptocurrency is transferred from the payer's electronic wallet to the affiliated store's electronic wallet according to payment via cryptocurrency using blockchain technology, the payment server 200 provides cryptocurrency cashback, an embodiment of the disclosure provides credits proportional to the amount of payment, as cashback, to the payer's credit electronic wallet, and the affiliated store receiving the amount of payment deducts points proportional to received points from the received points and stores in the affiliated store's credit electronic wallet.

To that end, the credits proportional to the amount of payment, as cashback, are provided to the payer's credit electronic wallet, and the affiliated store receiving the amount of payment deducts points proportional to received points from the received points and stores the points in the affiliated store's credit electronic wallet.

Referring to FIG. 3, the method may include a point loading step S310 in which the amount of money proportional to cryptocurrency loaded by the payer is converted into points and the converted points are loaded to the payer's point electronic wallet, a point transfer step S320 in which when payment is made in the affiliated store of the payment server 200, points corresponding to the amount of money to be sent for the payment are transferred to the affiliated store, a payment credit accrue step S330 in which credits proportional to the points corresponding to the amount of payment are cashbacked, as payment credits, to the payer's credit electronic wallet, an affiliated store credit accrue step S340 in which credits proportional to the points received by the affiliated store receiving the amount of payment are cashbacked, as reception credits, to the affiliated store's credit electronic wallet, and an affiliated store point accrue step S350 in which points corresponding to the reception credits are deducted from the points received by the affiliated store receiving the amount of payment and accrued in the affiliated store's point electronic wallet.

In the point loading step S310, the amount of money proportional to cryptocurrency loaded by the payer is converted into points which are then loaded to the payer's point electronic wallet. For example, member A may load his point electronic wallet with 100 points into which member A's cryptocurrency, e.g., 100 bitcoins, are converted.

According to an embodiment, some of the points corresponding to the cryptocurrency, e.g., 100 bitcoins, may be used to load member A's point electronic wallet while the other points may be converted into credits which are then accrued. For example, where member A loads his 100 bitcoins with 100 points using 100 bitcoins, 12 of the 100 points may be converted into 12 credits and saved while the remaining 88 points are accrued in member A's point electronic wallet.

In the point transfer step S320, where payment is made in an affiliated store of the payment server 200, points corresponding to the amount of payment are transferred to the affiliated store.

For example, where the payer purchases a good in a first affiliated store and pays for it, the payer clicks on the send button on the main screen shown in FIG. 4. When the send button is clicked, a confirm screen as shown in FIG. 5 is shown where the payer enters the amount of points to be sent and the address (or email address) of the recipient and then presses the confirm button. Then, e.g., a fingerprint authentication screen as shown in FIG. 6 is shown where the payer performs fingerprint authentication and, when successful, the transfer of points is complete.

For example, where member (or payer) A purchases a good worth 50 points in affiliated store B, 50 of the 88 points are transferred to affiliated store B and, thus, 38 points remain.

In the payment credit accrue step S330, credits proportional to the points corresponding to the amount of payment are cashbacked, as payment credits, to the payer's credit electronic wallet.

In the payment credit accrue step S330, credits resulting from applying a payment cashback ratio to the points corresponding to the amount of payment are cashbacked, as payment credits, to the payer's credit electronic wallet.

For example, in a case where the payment cashback ratio is 88% and member A purchases a good worth 50 points in affiliated store B, 50 of the 88 points remaining in member A's point electronic wallet are transferred to affiliated store B while the other 38 points remain. 88% of the 50 points transferred are cashbacked as credits, thus allowing 44 points (as cashback) to be accrued in member A's credit electronic wallet. As used herein, 'credit' is the unit of cashback of the payment company. Up to 1% of credits accrued everyday may be converted into points.

In the affiliated store credit accrue step S340, credits proportional to the points received by the affiliated store receiving the amount of payment are cashbacked, as reception credits, to the affiliated store's credit electronic wallet.

For example, in the affiliated store credit accrue step S340, credits resulting from applying an affiliated store cashback ratio to the points received by the affiliated store receiving the amount of payment may be cashbacked, as reception credits, to the affiliated store's credit electronic wallet.

For example, where the affiliated store cashback ratio is 12% and affiliated store B receives 50 points, as the payment for a good, from member A, 44 points, which are 88% of the 50 points received, are accrued onto the points of affiliated store B, and 6 points, which correspond to the reception cashback ratio of 12%, are accrued as 6 credits in affiliated store B.

In the affiliated store point accrue step S350, points corresponding to the received credits are deducted from the points received by the affiliated store receiving the amount of payment and accrued in the affiliated store's point electronic wallet.

For example, 6 points which correspond to the reception cashback ratio of 12% among the 50 points received are accrued as 6 credits in affiliated store B, and the remaining 44 points are accrued to the points of affiliated store B.

The payment cashback ratio is a ratio in which credits to be cashbacked are determined in proportion to points used for payment. To increase cashback efficiency, the ratio may be determined in two schemes as follows.

The payment cashback ratio may be varied depending on how often the payer uses the affiliated store (e.g., the frequency at which the user visits or uses the affiliated store). As more payments are made in an affiliated store having membership in the payment server 200, the payment cashback ratio may increase and more credits may be cashbacked. This scheme may lead to more use of the affiliated store.

The other scheme varies the payment cashback ratio depending on the kind of goods for which payment has been made in the affiliated store. If the same payment cashback ratio applies regardless of whether goods are expensive or cheap, payment for an expensive good may result in a too large amount of payment cashback. Given this situation, this scheme varies the payment cashback ratio.

The affiliated store cashback ratio is a ratio in which credits to be cashbacked are determined in proportion to points transferred to the affiliated store. To increase cashback efficiency, the affiliated store cashback ratio may be varied depending on the kind of goods carried in the affiliated store.

The payment cashback ratio and the affiliated store cashback ratio may be automatically varied in association with each other.

For example, where the overall size of cashback is set to 10%, and the payment cashback ratio is 7%, the affiliated store cashback ratio may be determined to be 3% and, when the payment cashback ratio is 6%, the affiliated store cashback ratio may be determined to be 4%.

If the payment cashback ratio and the affiliated store cashback ratio are separately determined or operated without being associated with each other, the total sum of cashback may not be controlled, and the amount of cashback accrued may exponentially increase.

Meanwhile, payment via cryptocurrency is performed by direct transfer of cryptocurrency between user and control signal, and this way may cause profit and loss due to fluctuations and resultantly failure in payment with an exact amount of money.

Thus, affiliated stores may be reluctant to make payment via cryptocurrency.

Given this, the affiliated store cashback ratio is determined considering profit and loss due to the cryptocurrency market fluctuations at the times of payment and transfer. Where a significant fluctuation occurs between the times of payment and transfer and, thus, the value of cryptocurrency is drastically lowered as compared with one point, the affiliated store's loss may be compensated by increasing the affiliated store cashback ratio.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A method of providing cryptocurrency cashback using a blockchain technology, in which when cryptocurrency is transferred from a payer's electronic wallet to an affiliated store's electronic wallet according to payment via cryptocurrency using the blockchain technology, a payment server provides cryptocurrency cashback, wherein credits proportional to the amount of payment are cashbacked to the payer's credit electronic wallet, and the affiliated store receiving the amount of payment deducts points proportional to received points from the received points and stores in the affiliated store's credit electronic wallet, the method comprising:
    a point loading step in which the amount of money proportional to cryptocurrency loaded by the payer is converted into points and the converted points are loaded to the payer's point electronic wallet;
    a point transfer step in which when payment is made in the affiliated store of the payment server, points corresponding to the amount of money to be sent for the payment are transferred to the affiliated store;
    a payment credit accrue step in which credits proportional to the points corresponding to the amount of payment are cashbacked, as payment credits, to the payer's credit electronic wallet;
    an affiliated store credit accrue step in which credits proportional to the points received by the affiliated store receiving the amount of payment are cashbacked, as reception credits, to the affiliated store's credit electronic wallet; and
    an affiliated store point accrue step in which points corresponding to the reception credits are deducted from the points received by the affiliated store receiving the amount of payment and accrued in the affiliated store's point electronic wallet, wherein a ratio for the credits are cashbacked to the payer's credit electronic wallet is automatically varied in association with a ratio for the credits cashbacked to the affiliated store's point electronic wallet.

2. The method of claim 1, wherein the payment credit accrue step includes cashbacking credits, which result from applying a payment cashback ratio to the points corresponding to the amount of payment, as payment credits, to the payer's credit electronic wallet.

3. The method of claim 2, wherein the payment cashback ratio is varied depending on how often the payer uses the affiliated store.

4. The method of claim 2, wherein the payment cashback ratio is varied depending on the kind of a good paid for in the affiliated store.

5. The method of claim 2, wherein the affiliated store credit accrue step includes cashbacking credits, which result from applying an affiliated store cashback ratio to the points received by the affiliated store receiving the amount of payment, as reception credits, to the affiliated store's credit electronic wallet.

6. The method of claim 5, wherein the affiliated store cashback ratio is varied depending on the kind of a good carried in the affiliated store.

7. The method of claim 2, wherein the payment cashback ratio and the affiliated store cashback ratio are automatically varied in association with each other.

8. The method of claim 2, wherein the affiliated store cashback ratio is determined considering profit and loss due to a cryptocurrency market fluctuation at a time of the payment and at a time of the transfer.

* * * * *